US012023927B2

(12) United States Patent
Yoshida

(10) Patent No.: US 12,023,927 B2
(45) Date of Patent: Jul. 2, 2024

(54) DRIVE BOARD, LIQUID JET HEAD, AND LIQUID JET RECORDING DEVICE

(71) Applicant: SII Printek Inc., Chiba (JP)

(72) Inventor: Kensuke Yoshida, Chiba (JP)

(73) Assignee: SII PRINTEK INC., Chiba (JP)

( * ) Notice: Subject to any disclaimer, the term of this patent is extended or adjusted under 35 U.S.C. 154(b) by 127 days.

(21) Appl. No.: 17/859,607

(22) Filed: Jul. 7, 2022

(65) Prior Publication Data

US 2023/0014022 A1 Jan. 19, 2023

(30) Foreign Application Priority Data

Jul. 19, 2021 (JP) ................................ 2021-118880

(51) Int. Cl.
*B41J 2/14* (2006.01)
*B41J 2/045* (2006.01)

(52) U.S. Cl.
CPC ....... *B41J 2/14209* (2013.01); *B41J 2/14201* (2013.01); *B41J 2/04581* (2013.01); *B41J 2002/14491* (2013.01); *B41J 2202/18* (2013.01)

(58) Field of Classification Search
CPC ......................... B41J 2/14209; B41J 2/14201; B41J 2/04581; B41J 2002/14491; B41J 2202/18
See application file for complete search history.

(56) References Cited

U.S. PATENT DOCUMENTS 10,625,503 B2 * 4/2020 Tomimatsu .......... B41J 2/14233
2011/0273497 A1 11/2011 Yamamoto
2018/0178511 A1 6/2018 Kashimura
2019/0263120 A1 8/2019 Tomimatsu

FOREIGN PATENT DOCUMENTS

JP 2018-103612 A 7/2018

OTHER PUBLICATIONS

Extended European Search Report in Europe Application No. 22181748.9, dated Nov. 17, 2022, 8 pages.

* cited by examiner

*Primary Examiner* — Geoffrey S Mruk
(74) *Attorney, Agent, or Firm* — Crowell & Moring LLP

(57) ABSTRACT

There is provided a drive board a manufacturing cost of which can be reduced while enhancing a liquid ejection performance. The drive board according to an embodiment of the present disclosure is a drive board which is applied to a liquid jet head, and outputs a drive signal to a jet section, and includes a first wiring layer and a second wiring layer opposed to each other along a direction perpendicular to a board surface, at least one drive device which is mounted on the first wiring layer, and is configured to generate the drive signal, a first power supply wiring line which is arranged in the first wiring layer, and is a wiring line configured to supply drive power toward the drive device, a differential line which is arranged in the first wiring layer, and is a line configured to transmit a differential signal toward the drive device, and a second power supply wiring line which is arranged in the second wiring layer, which is electrically coupled to the first power supply wiring line via a first through hole, and is opposed to a first area in the differential line. A wiring width in the second power supply wiring line is larger than a line width of the first area in the differential line.

9 Claims, 11 Drawing Sheets

Modified Example 2

Modified Example 1

Modified Example 1

Modified Example 2

Modified Example 2

DRIVE BOARD, LIQUID JET HEAD, AND LIQUID JET RECORDING DEVICE

RELATED APPLICATIONS

This application claims priority to Japanese Patent Application No. 2021-118880, filed on Jul. 19, 2021, the entire content of which is incorporated herein by reference.

BACKGROUND OF THE INVENTION

1. Field of the Invention

The present disclosure relates to a drive board, a liquid jet head, and a liquid jet recording device.

2. Description of the Related Art

Liquid jet recording devices equipped with liquid jet heads are used in a variety of fields, and a variety of types of liquid jet heads are developed (see, e.g., JP-A-2018-103612).

In such liquid jet heads, in general, it is required to enhance a liquid ejection performance and to reduce the manufacturing cost.

It is desirable to provide a drive board, a liquid jet head, and a liquid jet recording device in which the manufacturing cost can be reduced while enhancing the liquid ejection performance.

SUMMARY OF THE INVENTION

A drive board according to an embodiment of the present disclosure is a drive board which is applied to a liquid jet head having a jet section configured to jet liquid, and which is configured to output a drive signal for jetting the liquid to the jet section, and includes a first wiring layer and a second wiring layer opposed to each other along a direction perpendicular to a board surface, at least one drive device which is mounted on the first wiring layer, and which is configured to generate the drive signal, a first power supply wiring line which is arranged in the first wiring layer, and which is a wiring line configured to supply drive power toward the drive device, a differential line which is arranged in the first wiring layer, and which is a line configured to transmit a differential signal toward the drive device, and a second power supply wiring line which is arranged in the second wiring layer, which is electrically coupled to the first power supply wiring line via a first through hole, and which is opposed to a first area in the differential line. Further, a wiring width in the second power supply wiring line is larger than a line width of the first area in the differential line.

The liquid jet head according to an embodiment of the present disclosure includes the at least one drive board according to the embodiment of the present disclosure, and the jet section.

The liquid jet recording device according to an embodiment of the present disclosure includes the liquid jet head according to the embodiment of the present disclosure.

According to the drive board, the liquid jet head, and the liquid jet recording device related to the embodiment of the present disclosure, it becomes possible to reduce the manufacturing cost while enhancing the liquid ejection performance.

DETAILED DESCRIPTION OF THE PREFERRED EMBODIMENTS

An embodiment of the present disclosure will hereinafter be described in detail with reference to the drawings. It should be noted that the description will be presented in the following order.

1. Embodiment (an example of the case of disposing a second power supply wiring line as a plane with respect to a differential lines)
2. Modified Examples
   Modified Example 1 (an example of the case of further disposing a second ground wiring line as the plane, described above)
   Modified Example 2 (an example of the case of further disposing a return line to form a return path of a current)
3. Other Modified Examples

1. Embodiment

[Schematic Configuration of Printer 5]

Figure 1:
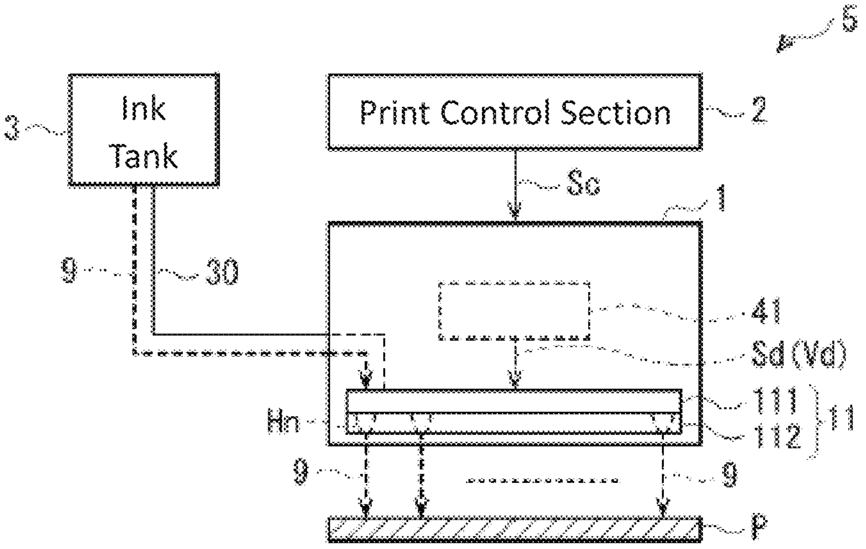
FIG. 1 is a block diagram showing a schematic configuration example of a liquid jet device according to an embodiment of the present disclosure.
Figure 2:
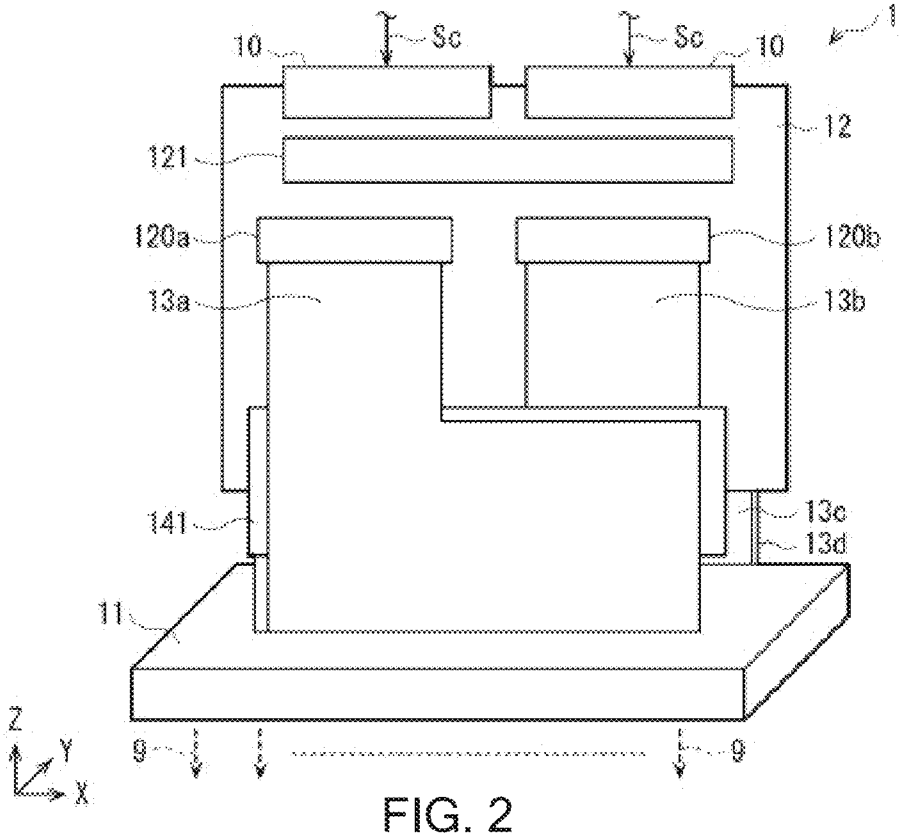
FIG. 2 is a perspective view schematically showing a general configuration example of a liquid jet head shown in FIG. 1.
Figure 3:
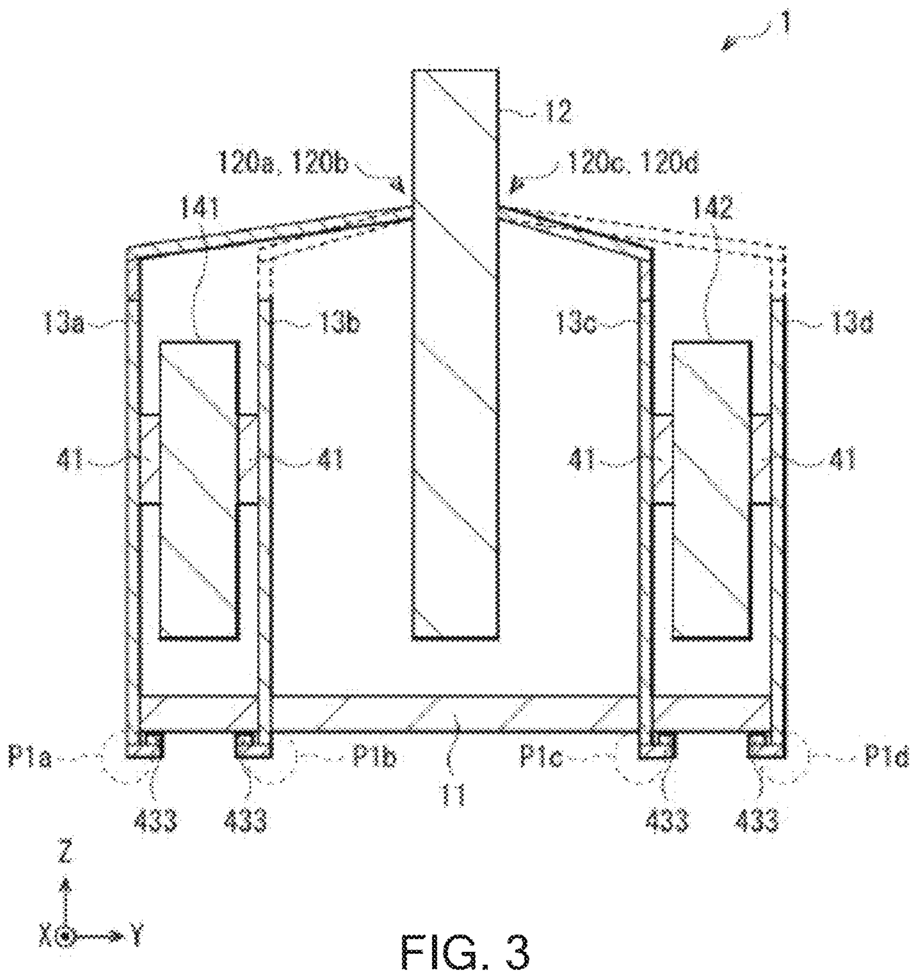
FIG. 3 is a cross-sectional view schematically showing a configuration example of the liquid jet head shown in FIG. 2.

FIG. 1 is a block diagram showing a schematic configuration example of a printer 5 as a liquid jet recording device according to an embodiment of the present disclosure. FIG. 2 is a diagram schematically showing a general configuration example of an inkjet head 1 as a liquid jet head shown in FIG. 1. FIG. 3 is a cross-sectional view (a Y-Z cross-sectional view) schematically showing a configuration example of the inkjet head 1 shown in FIG. 2. It should be noted that a scale size of each of the members is accordingly altered so that the member is shown in a recognizable size in the drawings used in the description of the present specification.

The printer 5 is an inkjet printer for performing recording (printing) of images, characters, and the like on a recording target medium (e.g., recording paper P shown in FIG. 1) using an ink 9 described later. As shown in FIG. 1, the printer 5 is provided with an inkjet head 1, a print control section 2, and an ink tank 3.

It should be noted that the inkjet head 1 corresponds to a specific example of a "liquid jet head" in the present disclosure, and the printer 5 corresponds to a specific example of a "liquid jet recording device" in the present disclosure. Further, the ink 9 corresponds to a specific example of a "liquid" in the present disclosure.

(A. Print Control Section 2)

The print control section 2 is for supplying the inkjet head 1 with a variety of types of information (data). Specifically, as shown in FIG. 1, the print control section 2 is arranged to supply each of constituents (drive devices 41 described later, and so on) in the inkjet head 1 with a print control signal Sc.

It should be noted that the print control signal Sc is arranged to include, for example, image data, an ejection timing signal, and a power supply voltage for operating the inkjet head 1.

(B. Ink Tank 3)

The ink tank 3 is a tank for containing the ink 9 inside. As shown in FIG. 1, the ink 9 in the ink tank 3 is arranged to be supplied to the inside (a jet section 11 described later) of the inkjet head 1 via an ink supply tube 30. It should be noted that such an ink supply tube 30 is formed of, for example, a flexible hose having flexibility.

(C. Inkjet Head 1)

As represented by dotted arrows in FIG. 1, the inkjet head 1 is a head for jetting (ejecting) the ink 9 shaped like a droplet from a plurality of nozzle holes Hn described later to the recording paper P to thereby perform recording of images, characters, and so on. As shown in, for example, FIG. 2 and FIG. 3, the inkjet head 1 is provided with a single jet section 11, a single I/F (interface) board 12, four flexible boards 13*a*, 13*b*, 13*c*, and 13*d*, and two cooling units 141, 142.

(C-1. I/F Board 12)

As shown in FIG. 2 and FIG. 3, the I/F board 12 is provided with two connectors 10, four connectors 120*a*, 120*b*, 120*c*, and 120*d*, and a circuit arrangement area 121.

As shown in FIG. 2, the connectors 10 are each a part (a connector part) for inputting the print control signal Sc, described above, and supplied from the print control section 2 toward the inkjet head 1 (the flexible boards 13*a*, 13*b*, 13*c*, and 13*d* described later).

The connectors 120*a*, 120*b*, 120*c*, and 120*d* are parts (connector parts) for electrically coupling the I/F board 12 and the flexible boards 13*a*, 13*b*, 13*c*, and 13*d*, respectively.

The circuit arrangement area 121 is an area where a variety of circuits are arranged on the I/F board 12. It should be noted that it is also possible to arrange that such a circuit arrangement area is disposed in other areas on the I/F board 12.

(C-2. Jet Section 11)

As shown in FIG. 1, the jet section 11 is a part which has the plurality of nozzle holes Hn, and jets the ink 9 from these nozzle holes Hn. Such jet of the ink 9 is arranged to be performed (see FIG. 1) in accordance with drive signals Sd (drive voltages Vd) supplied from the drive devices 41 described later on each of the flexible boards 13*a*, 13*b*, 13*c*, and 13*d*.

As shown in FIG. 1, such a jet section 11 is configured including an actuator plate 111 and a nozzle plate 112.

(Nozzle Plate 112)

The nozzle plate 112 is a plate formed of a film material such as polyimide, or a metal material, and has the plurality of nozzle holes Hn, described above, as shown in FIG. 1. These nozzle holes Hn are formed side-by-side at predetermined intervals, and each have, for example, a circular shape.

Specifically, in the example of the jet section 11 shown in FIG. 2, the plurality of nozzle holes Hn in the nozzle plate 112 is constituted by a plurality of nozzle arrays (four nozzle arrays) each arranged along the column direction (an X-axis direction). Further, these four nozzle arrays are arranged side-by-side along a direction (a Y-axis direction) perpendicular to the column direction.

(Actuator Plate 111)

The actuator plate 111 is a plate formed of a piezoelectric material such as PZT (lead zirconate titanate). The actuator plate 111 is provided with a plurality of channels (pressure chambers). These channels are each a part for applying pressure to the ink 9, and are arranged side-by-side so as to be parallel to each other at predetermined intervals. Each of the channels is partitioned with drive walls (not shown) formed of a piezoelectric body, and forms a groove section having a recessed shape in a cross-sectional view.

In such channels, there exist ejection channels for ejecting the ink 9, and dummy channels (non-ejection channels) which do not eject the ink 9. In other words, it is arranged that the ejection channels are filled with the ink 9, on the one hand, but the dummy channels are not filled with the ink 9, on the other hand. It should be noted that it is arranged that filling of the ink 9 to each of the ejection channels is performed via, for example, a flow channel (a common flow channel) commonly communicated with such ejection channels. Further, it is arranged that each of the ejection channels is individually communicated with the nozzle hole Hn in the nozzle plate 112, on the one hand, but each of the dummy channels is not communicated with the nozzle hole Hn, on the other hand. These ejection channels and the dummy channels are alternately arranged side-by-side along the column direction (the X-axis direction), described above.

Further, on the inner side surfaces opposed to each other in the drive wall, described above, there are respectively disposed drive electrodes. As the drive electrodes, there exist common electrodes disposed on the inner side surfaces facing the ejection channels, and active electrodes (individual electrodes) disposed on the inner side surfaces facing the dummy channels. These drive electrodes and the drive devices 41 described later are electrically coupled to each other via each of the flexible boards 13*a*, 13*b*, 13*c*, and 13*d*. Thus, it is arranged that the drive voltages Vd (the drive signals Sd), described above, are applied to the drive electrodes from the drive devices 41 via each of the flexible boards 13*a*, 13*b*, 13*c*, and 13*d* (see FIG. 1).

(C-3. Flexible Boards 13*a*, 13*b*, 13*c*, and 13*d*)

The flexible boards 13*a*, 13*b*, 13*c*, and 13*d* are each a board for electrically coupling the I/F board 12 and the jet section 11 to each other as shown in FIG. 2 and FIG. 3. It is arranged that these flexible boards 13*a*, 13*b*, 13*c*, and 13*d* individually control the jet actions of the ink 9 in the four nozzle arrays in the nozzle plate 112, described above, respectively. Further, as indicated by, for example, the reference symbols P1*a*, P1*b*, P1*c*, and P1*d* in FIG. 3, it is arranged that the flexible boards 13*a*, 13*b*, 13*c*, and 13*d* are folded around places (around clamping electrodes 433) where the flexible boards 13*a*, 13*b*, 13*c*, and 13*d* are coupled to the jet section 11, respectively. It should be noted that it is arranged that electrical coupling between the clamping electrodes 433 and the jet section 11 is achieved by, for example, thermocompression bonding using an ACF (Anisotropic Conductive Film).

On each of such flexible boards 13*a*, 13*b*, 13*c*, and 13*d*, there are individually mounted the drive devices 41 (see FIG. 3). These drive devices 41 are each a device for outputting the drive signals Sd (the drive voltages Vd) for jetting the ink 9 from the nozzle holes Hn in the corresponding nozzle array in the jet section 11. Therefore, it is arranged that such drive signals Sd are output from each of the flexible boards 13*a*, 13*b*, 13*c*, and 13*d* to the jet section 11. It should be noted that such drive devices 41 are each formed of, for example, an ASIC (Application Specific Integrated Circuit).

Further, these drive devices 41 are arranged to be cooled by the cooling units 141, 142, described above. Specifically, as shown in FIG. 3, the cooling unit 141 is fixedly disposed between the drive devices 41 on the flexible boards 13*a*, 13*b*, and by pressing the cooling unit 141 against these drive devices 41, the drive devices 41 are cooled. Similarly, the cooling unit 142 is fixedly disposed between the drive devices 41 on the flexible boards 13*c*, 13*d*, and by pressing the cooling unit 142 against these drive devices 41, the drive devices 41 are cooled. It should be noted that such cooling units 141, 142 can each be configured using a variety of types of cooling mechanisms.

[Detailed Configuration of Flexible Boards 13*a*, 13*b*, 13*c*, and 13*d*]

Subsequently, a detailed configuration example of the flexible boards 13*a*, 13*b*, 13*c*, and 13*d*, described above, will be described with reference to FIG. 4A, FIG. 4B, and FIG. 5 through FIG. 8 in addition to FIG. 1 through FIG. 3.

Figure 4A:
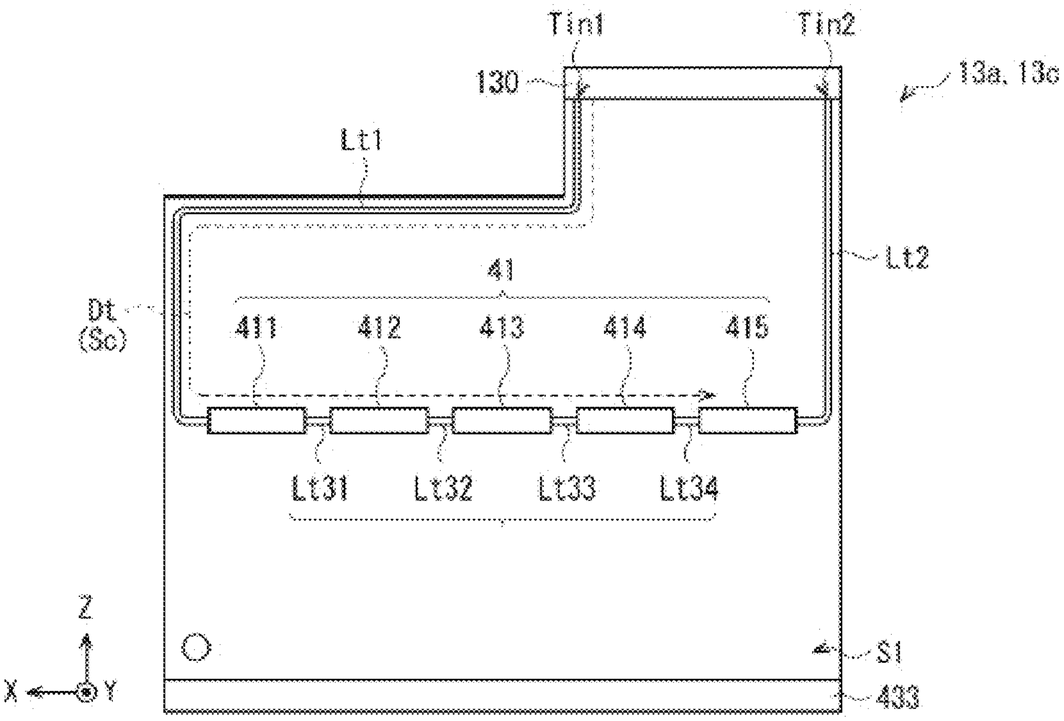
FIG. 4A is a plan view schematically showing a detailed configuration example of flexible boards shown in FIG. 2 and FIG. 3.
Figure 4B:
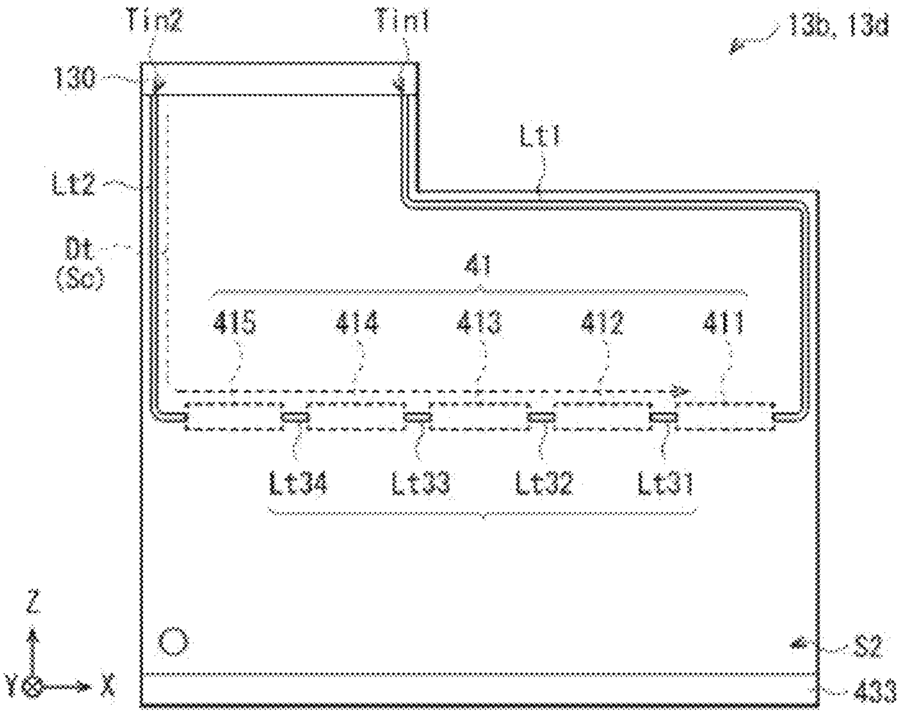
FIG. 4B is a plan view schematically showing a detailed configuration example of other flexible boards shown in FIG. 2 and FIG. 3.
Figure 5:
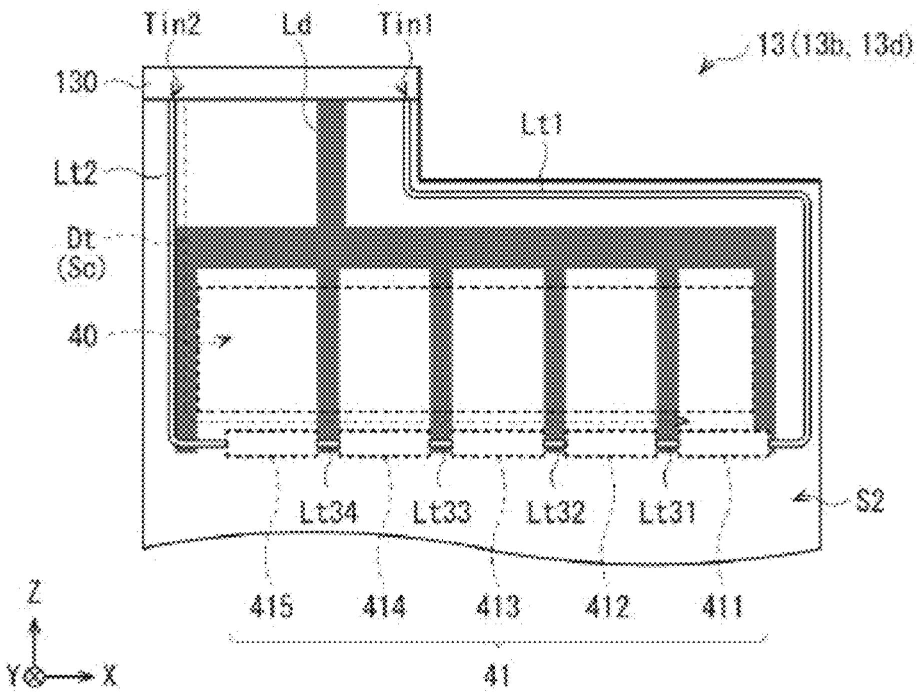
FIG. 5 is a plan view schematically showing an arrangement configuration example of wiring lines, and so on, in the flexible boards shown in FIG. 4B.
Figure 6:
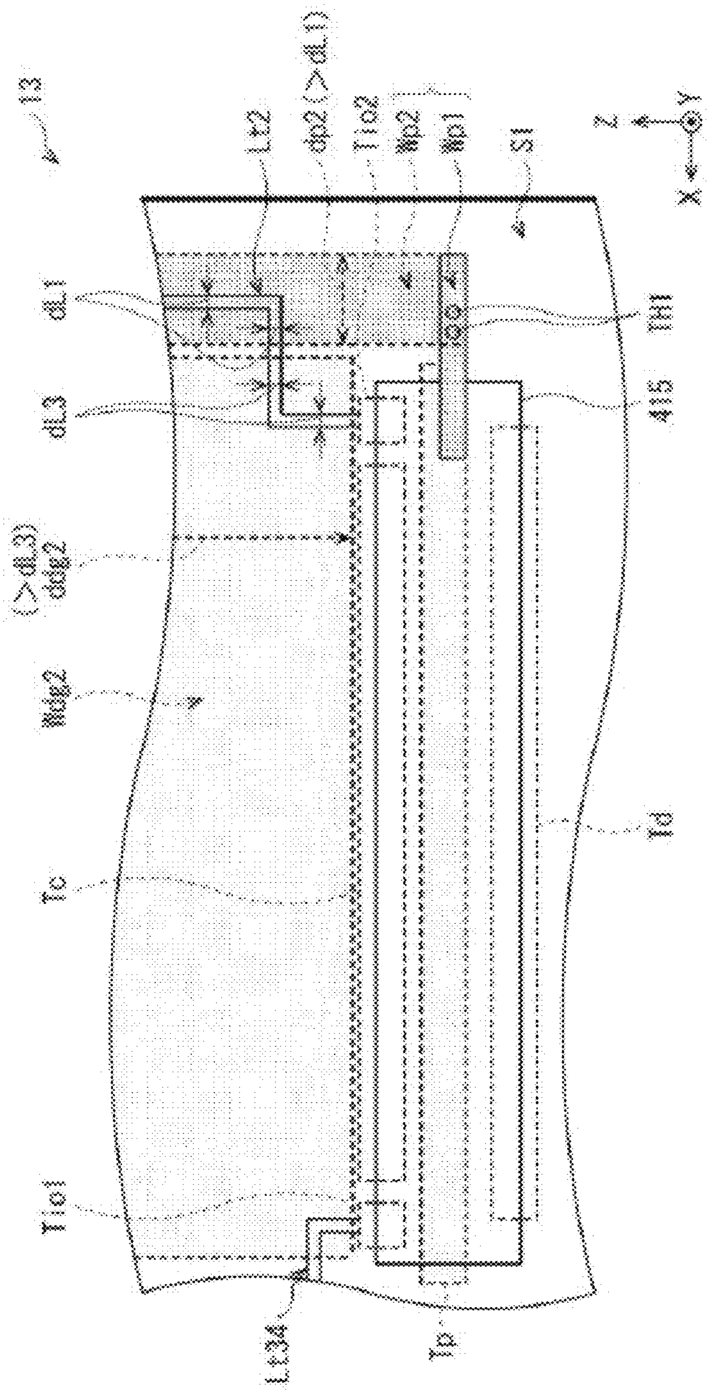
FIG. 6 is a plan view schematically showing a detailed arrangement configuration example of the wiring lines, and so on, shown in FIG. 5.
Figure 7:
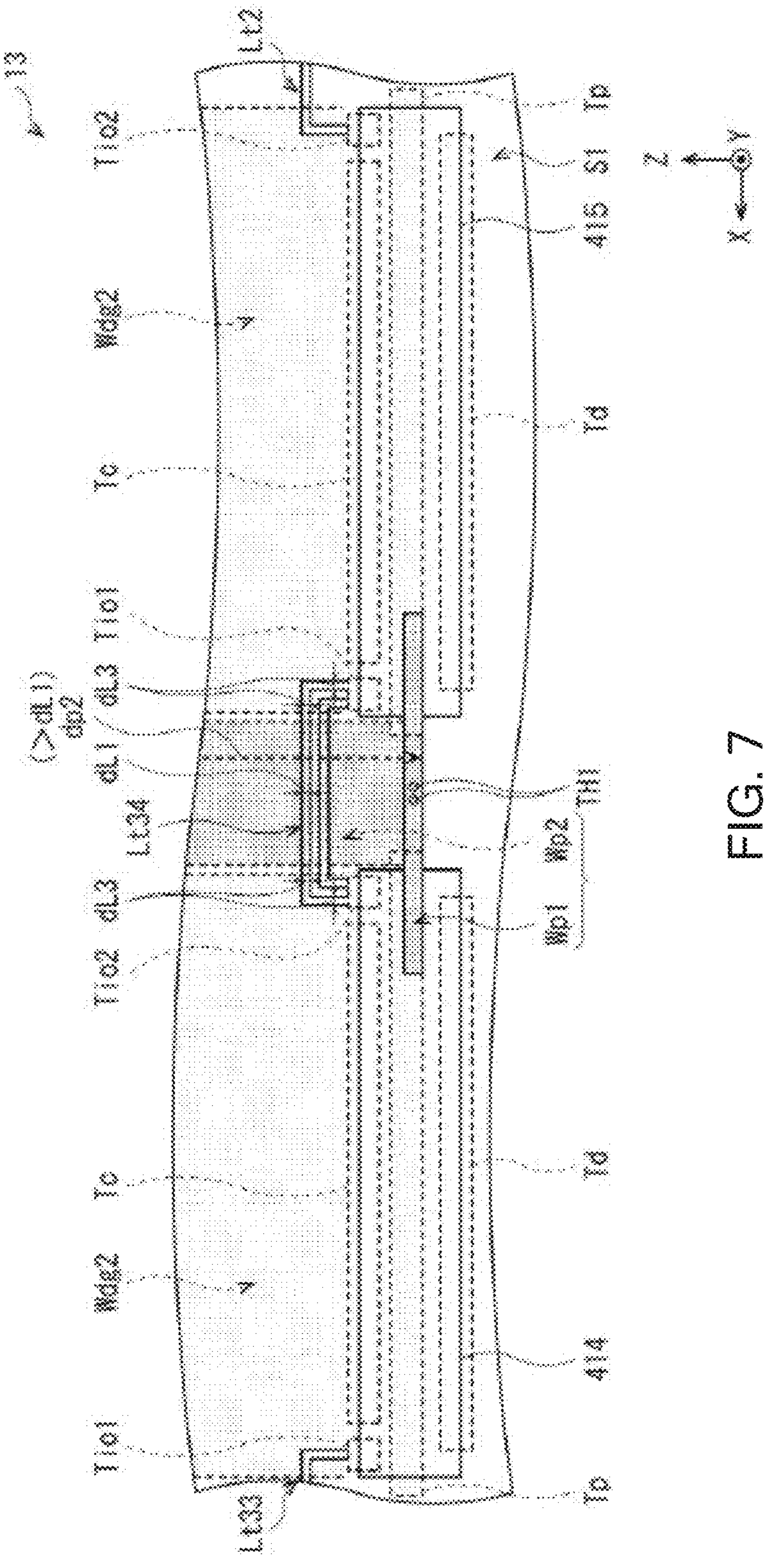
FIG. 7 is a plan view schematically showing a detailed arrangement configuration example of the wiring lines, and so on, shown in FIG. 5.
Figure 8:
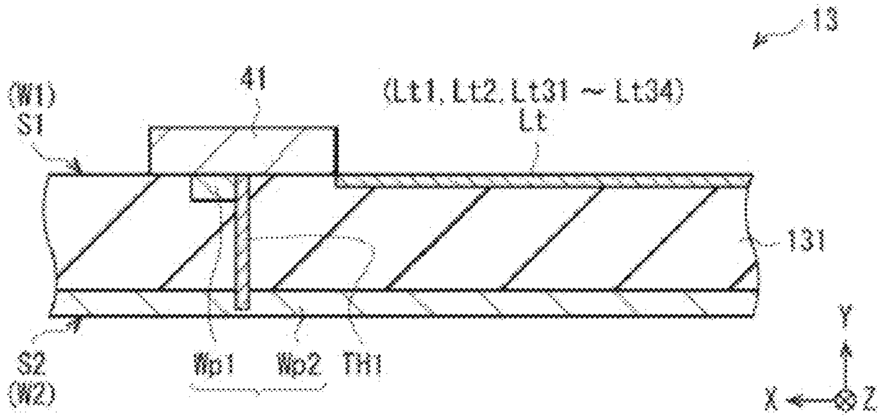
FIG. 8 is a cross-sectional view schematically showing the arrangement configuration example shown in FIG. 6 and FIG. 7.

FIG. 4A and FIG. 4B are plan views (Z-X plan views) schematically showing a detailed configuration example of the flexible boards 13*a* through 13*d* shown in FIG. 2 and FIG. 3. Specifically, FIG. 4A shows a planar configuration example (a Z-X planar configuration example) of the flexible boards 13*a*, 13*c*, and FIG. 4B shows a planar configuration example (a Z-X planar configuration example) of the flexible boards 13*b*, 13*d*. Further, FIG. 5 is a plan view (a Z-X plan view) schematically showing an arrangement configuration example of wiring lines, and so on, in the flexible boards 13*b*, 13*d* shown in FIG. 4B, and FIG. 6 and FIG. 7 are each a plan view (a Z-X plan view) schematically showing a detailed arrangement configuration example (a configuration example of the case of being illustrated from an obverse surface S1 side described later) of the wiring lines, and so on, shown in FIG. 5. FIG. 8 is a cross-sectional view (an X-Y cross-sectional view) schematically showing the arrangement configuration example shown in FIG. 6 and FIG. 7. It should be noted that in each of FIG. 5 through FIG. 8, the flexible boards 13*b*, 13*d* are shown with a collective reference of a flexible board 13. Further, in FIG. 5 through FIG. 8, described above, there is shown a configuration example of the case of the flexible boards 13*b*, 13*d*, but basically the same configuration is adopted in the case of the flexible boards 13*a*, 13*c*, described above. Further, in FIG. 8, a first differential line Lt1, a second differential line Lt2, and third differential lines Lt31 through Lt34 are shown with a collective reference of differential lines Lt, and are thereafter arbitrarily described as the differential lines Lt.

First, as shown in each of FIG. 4A, FIG. 4B, and FIG. 5, the following members are provided to each of these flexible boards 13*a* through 13*d*. That is, there are provided a coupling electrode 130, a first input terminal Tin1, a second input terminal Tin2, the first differential line Lt1, the second differential line Lt2, the third differential lines Lt31 through Lt34, the plurality of (five in this example) drive devices 41, and the clamping electrodes 433, described above.

The coupling electrodes 130 are disposed in an end part area at the I/F board 12 side in each of the flexible boards 13*a* through 13*d*, and are electrodes for electrically coupling each of the flexible boards 13*a* through 13*d* and the I/F board 12 to each other.

It is arranged that transmission data Dt (the print control signal Sc, described above) transmitted from the outside (the print control section 2, described above) of the inkjet head 1 is input to each of the first input terminal Tin1 and the second input terminal Tin2 (see FIG. 1, FIG. 2, FIG. 4A, FIG. 4B, and FIG. 5). Further, it is arranged that such transmission data Dt is transmitted to the inside of each of the flexible boards 13*a* through 13*d* via one of the first input terminal Tin1 and the second input terminal Tin2. Specifically, as shown in, for example, FIG. 4A, it is arranged that in each of the flexible boards 13*a*, 13*c*, the transmission data Dt is transmitted to the inside of each of the flexible boards 13*a*, 13*c* via the first input terminal Tin1. Meanwhile, as shown in, for example, FIG. 4B and FIG. 5, it is arranged that in each of the flexible boards 13*b*, 13*d*, the transmission data Dt is transmitted to the inside of each of the flexible boards 13*b*, 13*d* via the second input terminal Tin2.

The five drive devices 41, described above, are mounted on each of the flexible boards 13*a* through 13*d* (at the obverse surface S1 side out of the obverse surface S1 and a reverse surface S2) in the example shown in FIG. 4A, FIG. 4B, and FIG. 5. As such five drive devices 41, in the example shown in FIG. 4A, FIG. 4B, and FIG. 5, there are disposed a single first drive device 411, a single second drive device 415, and three third drive devices 412 through 414. Further, these five drive devices 41 are disposed in series (cascaded) to each other between the first input terminal Tin1 and the second input terminal Tin2 via a plurality of differential lines described later on the obverse surface S1, described above. Specifically, as shown in FIG. 4A, FIG. 4B, and FIG. 5, the first drive device 411, the third drive devices 412 through 414, and the second drive device 415 are disposed in series from the first input terminal Tin1 side toward the second input terminal Tin2 in this order in all of the flexible boards 13*a* through 13*d*. In other words, the first drive device 411 is located at one end of the serial arrangement of such drive devices 41, and at the same time, the second drive device 415 is located at the other end of this serial arrangement. Further, the plurality of (three in this example) third drive devices 412 through 414 are located between the first drive device 411 and the second drive device 415. Each of these five drive devices 41 is arranged to generate the drive signal Sd, described above, based on the transmission data Dt input via one of the first input terminal Tin1 and the second input terminal Tin2, as described above. It should be noted that the drive signals Sd generated in such a manner are arranged to be supplied toward the jet section 11, respectively, via the clamping electrodes 433, described above, on each of the flexible boards 13*a* through 13*d*.

Further, a plurality of transmission lines (differential lines) for transmitting the transmission data Dt via the five drive devices 41 arranged in series to each other are disposed between the first input terminal Tin1 and the second input terminal Tin2. In other words, the differential lines are lines for transmitting the transmission data Dt as differential signals toward each of the drive devices 41. Specifically, as shown in FIG. 4A, FIG. 4B, and FIG. 5, the first differential line Lt1 is disposed between the first input terminal Tin1 and the first drive device 411, and the second differential line Lt2 is disposed between the second input terminal Tin2 and the second drive device 415. Further, the third differential line Lt31 is disposed between the first drive device 411 and the third drive device 412, and the third differential line Lt32 is disposed between the third drive device 412 and the third drive device 413. The third differential line Lt33 is disposed between the third drive device 413 and the third drive device 414, and the third differential line Lt34 is disposed between the third drive device 414 and the second drive device 415.

Here, as described above, the input terminal (the first input terminal Tin1 or the second input terminal Tin2) to which the transmission data Dt is input is different (see FIG. 4A, FIG. 4B, and FIG. 5) between the flexible boards 13*a*, 13*c* and the flexible boards 13*b*, 13*d*. Further, in accordance therewith, the transmission direction inside the board of the transmission data Dt input is different between the flexible boards 13*a*, 13*c* and the flexible boards 13*b*, 13*d*. In other words, it is arranged that the transmission data Dt having been input from the first input terminal Tin1 is transmitted to the first drive device 411, the third drive devices 412, 413, and 414, and the second drive device 415 in this order (see FIG. 4A) in each of the flexible boards 13*a*, 13*c*. In contrast, it is arranged that the transmission data Dt, having been input from the second input terminal Tin2, is transmitted to the second drive device 415, the third drive devices 414, 413, and 412, and the first drive device 411 in this order (see FIG. 4B, FIG. 5) in each of the flexible boards 13*b*, 13*d*.

In such a manner, the input terminal to which the transmission data Dt is input and the transmission direction of the transmission data Dt are different between the flexible boards 13*a*, 13*c* and the flexible boards 13*b*, 13*d*. It should be noted that the flexible boards 13*a*, 13*c* and the flexible boards 13*b*, 13*d* are made the same in the structure of the board itself as each other, and the configurations of the flexible boards 13*a* through 13*d* are commonalized (shared) (see FIG. 4A, FIG. 4B, and FIG. 5). In other words, there is no need to prepare a plurality of types of flexible boards (drive boards) in accordance with the transmission direction of the transmission data Dt, and so on, and it results in that there is disposed only a single type of flexible board (drive board) in the inkjet head 1.

Further, as shown in FIG. 5, in the flexible boards 13, there are arranged drive power supply lines Ld for supplying the drive power toward the drive devices 41 (the first drive device 411, the third drive devices 412, 413, and 414, and the second drive device 415). Further, on the flexible boards 13 (the reverse surface S2), there is disposed a component arrangement area 40 in which a variety of types of components other than the drive devices 41 are arranged.

Here, as shown in each of FIG. 6 through FIG. 8, as the drive power supply lines Ld, described above, there are included a first power supply wiring line Wp1, a second power supply wiring line Wp2, a second digital ground wiring line Wdg2, and so on. It should be noted that in the planar configuration example of the flexible boards 13 shown in FIG. 6 and FIG. 7, FIG. 6 shows an arrangement configuration example of the wiring lines in the vicinity of the second drive device 415, and FIG. 7 shows an arrangement configuration example of the wiring lines in the vicinity of the second drive device 415 and the third drive device 414.

Further, as shown in FIG. 8, the flexible boards 13 in the present embodiment each formed as a double-sided board with a double-layered structure having the obverse surface S1 and the reverse surface S2, described above. Specifically, the flexible boards 13 each have a first wiring layer W1 at the obverse surface S1 side and a second wiring layer W2 at the reverse surface S2 side opposed to each other along a direction (the Y-axis direction) perpendicular to the board surfaces (a Z-X plane) as wiring layers of such a double-layered structure.

(Drive Devices 41)

First, the drive devices 41 (the first drive device 411, the third drive devices 412, 413, and 414, and the second drive device 415), described above, are mounted on the first wiring layer W1 at the obverse surface S1 side in the flexible boards 13, as shown in FIG. 6 through FIG. 8. Further, as shown in FIG. 6 and FIG. 7, the drive devices 41 has a first input/output section Tio1, a second input/output section Tio2, a control terminal section Tc, a drive terminal section Td, and a power supply terminal section Tp.

As shown in, for example, FIG. 6 and FIG. 7, to the first input/output section Tio1 and the second input/output section Tio2, there are coupled the differential lines Lt (the first differential line Lt1, the second differential line Lt2, and the third differential lines Lt31 through Lt34), described above. Specifically, the first differential line Lt1 is arranged to couple the first input terminal Tin1 and the first input/output section Tio1 in the first drive device 411 to each other. Further, the second differential line Lt2 is arranged to couple the second input terminal Tin2 and the second input/output section Tio2 in the second drive device 415 to each other (see FIG. 6 and FIG. 7). Further, the four third differential lines Lt31 through Lt34 couple the second input/output section Tio2 in the first drive device 411 and the first input/output section Tio1 in the second drive device 415 to each other via the three third drive devices 412 through 414. Specifically, the third differential line Lt31 couples the second input/output section Tio2 in the first drive device 411 and the first input/output section Tio1 in the third drive device 412 to each other. Further, the third differential line Lt32 couples the second input/output section Tio2 in the third drive device 412 and the first input/output section Tio1 in the third drive device 413 to each other. The third differential line Lt33 couples the second input/output section Tio2 in the third drive device 413 and the first input/output section Tio1 in the third drive device 414 to each other (see FIG. 7). The third differential line Lt34 couples the second input/output section Tio2 in the third drive device 414 and the first input/output section Tio1 in the second drive device 415 to each other (see FIG. 6 and FIG. 7).

The control terminal section Tc is a terminal section for electrically coupling control lines (wiring lines for performing a variety of types of control to the drive devices 41) on the flexible boards 13 to each of the drive devices 41. The control terminal section Tc extends along a long axis direction (the X-axis direction) of each of the drive devices 41 at an input side (a positive direction side along the Z axis) of each of the drive devices 41.

The drive terminal section Td is a terminal section for electrically coupling signal lines (signal lines Ws described later) for transmitting the drive signals Sd output from each of the drive devices 41 to each of the drive devices 41. The drive terminal section Td extends along the long axis direction (the X-axis direction) of each of the drive devices 41 at an output side (a negative direction side along the Z axis) of each of the drive devices 41.

As shown in, for example, FIG. 6 and FIG. 7, the power supply terminal section Tp extends along the long axis direction (the X-axis direction) of each of the drive devices 41 in an area between the control terminal section Tc and the drive terminal section Td in each of the drive devices 41. It is arranged that the drive power is supplied to the power supply terminal section Tp from the first power supply wiring line Wp1 described later (see FIG. 6 and FIG. 7).

(Differential Lines Lt)

The differential lines Lt (the first differential line Lt1, the second differential line Lt2, and the third differential lines Lt31 through Lt34) are each arranged in the first wiring layer W1 at the obverse surface S1 side in the flexible boards 13 as shown in FIG. 6 through FIG. 8. As described above, these differential lines Lt are lines for transmitting the transmission data Dt as differential signals, and are formed using, for example, LVDS (Low Voltage Differential Signaling). It should be noted that it is possible for each of the differential lines Lt to be formed using, for example, CML (Current Mode Logic) or ECL (Emitter Coupled Logic).

Further, these differential lines Lt are each formed using, for example, a so-called microstrip line or a coplanar line. Further, although the details will be described later, impedance control on each of the differential lines Lt is performed so that the characteristic impedance in each of the differential lines Lt becomes 100Ω. It should be noted that a setting value of the characteristic impedance is not limited to 100Ω, described above, but can be set to other setting values such as 150Ω. It should be noted that when setting the setting value of the characteristic impedance to a value different from 100Ω or 150Ω, the power loss in each of the differential lines Lt increases, and there is a possibility that the accuracy of the signal transmission lowers in some cases.

It should be noted that it is possible to arrange that a variety of components (e.g., a capacitance for AC coupling which becomes necessary when the common voltage is different between an output side device and an input side device), through holes, and so on, are arranged on such differential lines Lt. Further, when it is arranged to dispose the through holes, it is possible to arrange to disposed the through holes in the vicinity of the variety of types of power supply wiring lines and the ground wiring lines in order to perform the impedance control on the through holes.

(First Power Supply Wiring Line Wp1, Second Power Supply Wiring Line Wp2, Second Digital Ground Wiring Line Wdg2)

As shown in FIG. 6 through FIG. 8, the first power supply wiring line Wp1, described above, is arranged in the first wiring layer W1 at the obverse surface S1 side in the flexible boards 13. As shown in, for example, FIG. 6 and FIG. 7, the first power supply wiring line Wp1 is a wiring line for supplying the drive power (power supply potential) toward the drive devices 41 via the power supply terminal Tp, described above.

As shown in FIG. 6 through FIG. 8, the second power supply wiring line Wp2 (represented by dotted lines in each of FIG. 6 and FIG. 7), described above, is arranged in the second wiring layer W2 at the reverse surface S2 side in the flexible boards 13. As shown in, for example, FIG. 6 through FIG. 8, the second power supply wiring line Wp2 is electrically coupled to the first power supply wiring line Wp1, described above, via first through holes TH1. Further, as shown in, for example, FIG. 6 and FIG. 7, the second power supply wiring line Wp2 extends in the second wiring layer W2 along a positive direction of the Z axis from the vicinity of the both ends (the vicinity of the first input/output section Tio1 and the second input/output section Tio2) along the long axis direction (the X-axis direction) in each of the drive devices 41. Further, as shown in, for example, FIG. 6 and FIG. 7, the second power supply wiring line Wp2 is arranged so as to be opposed to (overlap) a partial area (a first area A1 described later) in the differential line Lt, described above.

As represented by dotted lines in, for example, FIG. 6 and FIG. 7, the second digital ground wiring line Wdg2 is arranged in the second wiring layer W2 at the reverse surface S2 side in the flexible boards 13. Specifically, as shown in, for example, FIG. 6 and FIG. 7, the second digital ground wiring line Wdg2 is arranged at the input side (the positive direction side in the Z axis) of the control terminal section Tc in each of the drive devices 41 in the second wiring layer W2. Such a second digital ground wiring line Wdg2 is a wiring line functioning as the digital ground in the variety of control signals (digital signals) input to the control terminal section Tc, described above, in each of the drive devices 41. Further, as shown in, for example, FIG. 6 and FIG. 7, the second digital ground wiring line Wdg2 is arranged so as to be opposed to (overlap) a partial area (a third area) in the differential lines Lt, described above.

Here, as shown in, for example, FIG. 6, the second differential line Lt2 is arranged so as to be opposed to the second power supply wiring line Wp2 along the extending direction (the Z-axis direction) of the second power supply wiring line Wp2, and is then arranged so as to be opposed to the second digital ground wiring line Wdg2, and is then coupled to the second input/output section Tio2 of the second drive device 415. Similarly, the first differential line Lt1 is arranged so as to be opposed to the second power supply wiring line Wp2 along the extending direction (the Z-axis direction) of the second power supply wiring line Wp2, and is then arranged so as to be opposed to the second digital ground wiring line Wdg2, and is then coupled to the first input/output section Tio1 of the first drive device 411. Further, as shown in, for example, FIG. 6 and FIG. 7, each of the differential lines Lt is arranged along the X-axis direction so as to be perpendicular to a boundary line (a line along the Z-axis direction) between the second power supply wiring line Wp2 and the second digital ground wiring line Wdg2 in the vicinity of the boundary therebetween. It should be noted that in the vicinity of such a boundary, as shown in, for example, FIG. 6 and FIG. 7, since the capacitance value provided to the second power supply wiring line Wp2 becomes low in a gap area between the second power supply wiring line Wp2 and the second digital ground wiring line Wdg2, it results in that the characteristic impedance of each of the differential lines Lt changes. In order to minimize such a variation in the characteristic impedance, it is required to arrange each of the differential lines Lt so as to be perpendicular to the boundary line therebetween, as described above, or to minimize the width of the gap area, described above. It should be noted that as the width of the gap area, there can be cited, for example, a value with which about 10 [μm/V] is achieved when the potential difference between the second power supply wiring line Wp2 and the second digital ground wiring line Wdg2 is no larger than 30 V. Specifically, when the potential difference therebetween is 25 V, it is desirable to keep the width of the gap area no smaller than 0.25 mm.

(Magnitude Relation Between Wiring Width and Line Width)

Here, in the flexible boards 13 in the present embodiment, as shown in, for example, FIG. 6 and FIG. 7, a wiring width dp2 in the second power supply wiring line Wp2 is made larger than a line width dL1 of the first area A1 (an opposed area to the second power supply wiring line Wp2), described above, in the differential line Lt (dp2>dL1). Further, as shown in, for example, FIG. 6 and FIG. 7, a wiring width ddg2 in the second digital ground wiring line Wdg2 is made larger than a line width dL3 of the third area (an opposed area to the second digital ground wiring line Wdg2), described above, in the differential line Lt (ddg2>dL3).

It should be noted that the width direction in the wiring widths dp2, ddg2 and the line widths dL1, dL3 mentioned here means a width direction based on an extending direction of each of the differential lines Lt, and it results in that the width direction also changes in accordance with the extending direction (the Z-axis direction or the X-axis direction in the example in FIG. 6 and FIG. 7) of each of the differential lines. Incidentally, in the example in FIG. 6 and FIG. 7, regarding the line widths dL1, dL3, the cases of the respective extending directions of the plurality of types are illustrated. In contrast, in the example in FIG. 6 and FIG. 7, regarding the wiring widths dp2, ddg2, only the case of one of the extending directions of the plurality of types is illustrated for the sake of convenience. It should be noted that the meaning of these width directions are hereinafter the same as above, including the cases of modified examples described later.

The reason that the wiring widths of the second power supply wiring line Wp2 and the second digital ground wiring line Wdg2 are set wide in such a manner is as follows. That is, when these wiring widths are set narrow, an inductor component on the differential lines Lt increases, and therefore, there is a possibility that the quality of the transmission signal deteriorates due to an increase in the characteristic impedance. Further, the reason is that when the widths themselves of these power supply wiring lines decrease, wiring resistance values increase, and the inductor components of the power supply wiring lines increase, and thus stable power supply becomes difficult, and there is a possibility that a performance deterioration is incurred. Incidentally, in order to provide the differential lines Lt with a stable characteristic impedance, as values of the wiring widths dp2, ddg2, described above, there can be cited, as an example, values (dp2≥(3×dL1), ddg2≥(3×dL3)) no smaller than three times as large as the line widths dL1, dL3, described above.

Here, the flexible boards 13, 13*a* through 13*d*, described above, each correspond to a specific example of a "drive board" in the present disclosure. Further, the obverse surface S1 and the first wiring layer W1 each correspond to a specific example of a "first wiring layer" in the present disclosure, and the reverse surface S2 and the second wiring layer W2 each correspond to a specific example of a "second wiring layer" in the present disclosure. Further, the first input terminal Tin1 and the second input terminal Tin2 respectively correspond to specific examples of a "first input terminal" and a "second input terminal" in the present disclosure. Further, the transmission data Dt (the print control signal Sc) corresponds to a specific example of a "differential signal" in the disclosure. Further, the first differential line Lt1, the second differential line Lt2, and the third differential lines Lt31 through Lt34 each correspond to a specific example of a "differential line" in the present disclosure.

[Operations and Functions/Advantages]

(A. Basic Operation of Printer 5)

In the printer 5, a recording operation (a printing operation) of images, characters, and so on, to the recording target medium (the recording paper P, and so on) is performed using such a jet operation of the ink 9 by the inkjet head 1, as described below. Specifically, in the inkjet head 1 according to the present embodiment, the jet operation of the ink 9 using a shear mode is performed in the following manner.

First, the drive devices 41 on each of the flexible boards 13*a*, 13*b*, 13*c*, and 13*d* each apply the drive voltage Vd (the drive signal Sd) to the drive electrodes (the common electrode and the active electrode), described above, in the actuator plate 111 in the jet section 11. Specifically, each of the drive devices 41 applies the drive voltage Vd to the drive electrodes disposed on the pair of drive walls partitioning the ejection channel, described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel, as a result.

Subsequently, the ink 9 having been induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 112 (or timing in the vicinity of that timing). Thus, the drive walls are restored from the state of the flexion deformation, described above, and as a result, the volume of the ejection channel having once increased is restored again.

In such a manner, the pressure in the ejection channel increases in the process that the volume of the ejection channel is restored, and thus, the ink 9 in the ejection channel is pressurized. As a result, the ink 9 shaped like a droplet is ejected (see FIG. 1) toward the outside (toward the recording paper P) through the nozzle hole Hn. The jet operation (the ejection operation) of the ink 9 in the inkjet head 1 is performed in such a manner, and as a result, the recording operation of images, characters, and so on, to the recording paper P is performed.

(B. Functions/Advantages in Inkjet Head 1)

Subsequently, functions and advantages in the inkjet head 1, according to the present embodiment, will be described in detail with reference to configuration examples (FIG. 9A, FIG. 9B) of a typical transmission line in the related art.

(B-1. Regarding Configuration Example of Typical Transmission Line)

First, in the inside of the inkjet printer, there is frequently used a flexible board on which the drive device is mounted. This is for increasing the degree of freedom of the arrangement of wiring, and so on, compared to the case of a rigid board (an inflexible board) by using the flexible board to thereby achieve reduction in size of the inkjet head. However, since the flexible board large in the number of wiring layers is generally higher in price than the rigid board, it can be said that use of such a flexible board is unsuitable from the viewpoint of the manufacturing cost of the inkjet head. Therefore, there are proposed a variety of methods of devising the layout of a variety of wiring lines and components in the flexible board while keeping the performance and the fabrication yield of the inkjet head.

Further, in recent years, due to an increase in print speed for a productivity improvement, and an increase in an amount of data caused by an increase in the number of nozzles of the inkjet head, fast differential transmission such as LVDS or CML, described above, has frequently been used. Therefore, it matters how efficiently the differential lines (fast differential lines) are laid around in the inkjet head having a limited space. Further, as a method of efficiently transmitting the fast differential signals on this occasion, there can be cited the impedance control, described above.

The impedance control is a method of controlling the characteristic impedance of the transmission line to prevent the electrical power from being reflected on the transmission line to thereby make it possible to transmit a high-frequency signal. Specifically, the characteristic impedance of the transmission line is set to have a desired value using a width and a thickness of the transmission line, a distance between the transmission line and a plane arranged on the periphery of the transmission line, a dielectric constant of a dielectric body on the periphery of the transmission line, and so on. A value of the characteristic impedance on this occasion is typically set to 50Ω, but in the case of the differential lines, described above, a value of the characteristic impedance between a pair of lines is set to 100Ω.

Here, when performing such impedance control, in general, it is necessary to set the number of the wiring layers in the board to a value no smaller than 2. This is for providing an appropriate capacitance to the transmission lines to be the target of the impedance control.

Figure 9A:
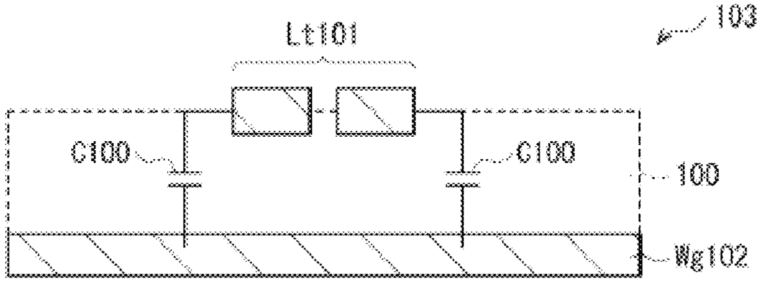
FIG. 9A is a schematic cross-sectional view showing a configuration example of a typical transmission line.
Figure 9B:
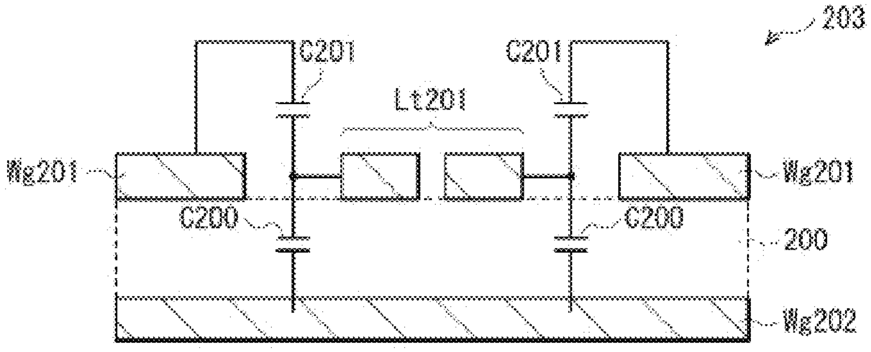
FIG. 9B is a schematic cross-sectional view showing another configuration example of a typical transmission line.

FIG. 9A and FIG. 9B are each a cross-sectional view schematically showing a configuration example of a typical transmission line. Specifically, the transmission line shown in FIG. 9A is a so-called microstrip line, and the transmission line shown in FIG. 9B is a so-called coplanar line.

First, in the transmission line shown in FIG. 9A, a line (a differential line Lt101) is arranged in a first layer (on an obverse surface) in a double-sided board (a drive board 103) having a double-layered structure, and a ground wiring line Wg102 is arranged in a second layer (on a reverse surface). Further, in the transmission line shown in FIG. 9B, similarly to the case of FIG. 9A, first, a line (a differential line Lt201) is arranged in a first layer (on an obverse surface) in a double-sided board (a drive board 203) having a double-layered structure, and a ground wiring line Wg202 is arranged in a second layer (on a reverse surface). Further, in the transmission line shown in FIG. 9B, there are further arranged other ground wiring lines Wg201 at both sides of the differential lines Lt201 in the first layer, respectively.

In each of the transmission lines in FIG. 9A and FIG. 9B having such configurations, a base member located between the first layer and the second layer functions as a dielectric body (a dielectric layer 100, 200), and as a result, a capacitance (a capacitance C100, C200) is provided to the line (the differential line Lt101, Lt201). Further, in particular in the transmission line shown in FIG. 9B, it is arranged that the capacitance C201 is further provided due to the other ground wiring lines Wg201 at the both sides of the differential lines Lt201.

Incidentally, the configuration of such transmission lines (the differential lines) as shown in FIG. 9A, FIG. 9B places a significant limitation on a variety of wiring arrangements in a small board. Further, when setting, for example, the wiring width of the power supply narrow, the performance of supplying the drive power to the drive devices lowers to lower the performance of ejecting the ink in the inkjet head as a result. It should be noted that in the case of the single-end transmission low in signal frequency which is used for related-art inkjet heads, the impedance control is not performed unlike the case of the differential lines, described above, and therefore, such a limitation on the wiring arrangements does not exist.

Further, due to the limitation on the wiring arrangements, described above, when performing the impedance control in the differential lines, it can be said that it is desirable for the number of wiring layers in the drive board to be basically no smaller than three. Specifically, an ideal layer configuration in such a drive board is as follows.

First layer: wiring layer (Signal wiring lines related to control of drive devices are mainly arranged, and some of power supply wiring lines for the drive devices are also arranged.)

Second layer: ground layer (Ground wiring lines for the drive devices are mainly arranged.)

Third layer: power supply layer (Power supply wiring lines for the drive devices are mainly arranged, and some of the signal wiring lines for the drive devices are also arranged.)

Here, in the case of such a three-layer structure, it is possible to, for example, arrange the signal wiring lines (the differential lines) for transmitting digital data for printing in the first layer or the third layer, and perform the impedance control for making the drive board compatible with the fast differential transmission in the ground wiring lines in the second layer. Further, in the power supply layer in the third layer, a supply pattern of the drive power to the drive devices can be coped with by the power supply wiring lines wide in wiring width and high in quality. Therefore, due to such a three-layer structure, it becomes possible to enhance the performance of supplying the drive power to the drive devices to thereby enhance the ink ejection performance in the inkjet head.

However, the board having such a three-layer structure results in growth in manufacturing cost. In other words, when increasing the number of layers of the board in order to perform the impedance control, the ejection performance of the inkjet head is enhanced on the one hand, but the growth in manufacturing cost is incurred on the other hand.

In such a manner, it can be said that it is difficult for the configuration example of the typical transmission lines in the related art to achieve both of the enhancement of the ink ejection performance and the reduction in manufacturing cost when being applied to the drive board of the inkjet head.

(B-2. Functions/Advantages)

In contrast, in the flexible boards 13 (13*a* through 13*d*) in the inkjet head 1 according to the present embodiment, since the following configuration is adopted, it is possible to obtain, for example, the following functions and advantages.

That is, first, in the flexible boards 13, the wiring width dp2 in the second power supply wiring line Wp2 in the second wiring layer W2 arranged to be opposed to the first area A1 of the differential line Lt in the first wiring layer W1 is made larger than the line width dL1 of the first area A1 in the differential line Lt (dp2>dL1).

Thus, the second power supply wiring line Wp2 functions as a plane for adding the electrical capacitance to the differential line Lt, and thus, the impedance control of the differential line Lt is performed by the second power supply wiring line Wp2, as a result. Therefore, the following is achieved compared to when, for example, performing the impedance control using the ground wiring lines (e.g., the second digital ground wiring line Wdg2, described above) in the second wiring layer W2 as the plane, described above (a comparative example). That is, it is possible to widen the wiring width dp2 of the second power supply wiring line Wp2, and thus, the performance of supplying the drive power to the drive devices 41 is enhanced, as a result.

Further, in the present embodiment, unlike such a comparative example, it is unnecessary to use the ground wiring patterns in the second wiring layer W2 as the plane, and therefore, it is possible to reduce the wiring patterns of such ground wiring lines compared to the comparative example, described above. Therefore, since it is possible to ensure the degree of freedom of the wiring arrangement even when the wiring layers of the flexible boards 13 (13*a* through 13*d*) have the structure of the two layers (the first wiring layer W1 and the second wiring layer W2), it becomes unnecessary to dispose three or more wiring layers unlike the case of the related art, described above.

According to the above, in the present embodiment, it becomes possible to reduce the manufacturing cost of the flexible boards 13 and the inkjet head 1 while enhancing the performance of ejecting the ink 9 using the drive signals Sd output from the drive devices 41.

Further, in the present embodiment, even when arranging (cascading) the plurality of drive devices 41 in series with each other via the plurality of differential lines Lt between the first input terminal Tin1 and the second input terminal Tin2, described above, the following is achieved. That is, in such a manner as, described above, it becomes possible to perform the impedance control of each of the differential lines Lt. In other words, by ensuring the performance of supplying the drive power to each of the drive devices 41, in such a manner as described above, it becomes possible to suppress a variation in the performance of ejecting the ink 9 due to the drive signals Sd output from the drive devices 41.

Further, in the present embodiment, since it is arranged that the drive board, described above, is constituted by the flexible boards 13 (13*a* through 13*d*), in such a manner, as described above, the effect of reducing the manufacturing cost due to the fact that the degree of freedom of the wiring arrangements can be ensured even when providing the double-layered structure to the wiring layers is further enhanced. In other words, in general, in the flexible boards, the manufacturing cost is apt to grow due to the increase in the number of wiring layers compared to inflexible boards (rigid boards), and therefore, it can be said that the effect of reducing the manufacturing cost is further enhanced by the fact that the degree of freedom of the wiring arrangements can be ensured even when the wiring layers have the double-layered structure.

2. Modified Examples

Subsequently, some modified examples (Modified Example 1 and Modified Example 2) of the embodiment, described above, will be described. It should be noted that hereinafter, the same constituents as those in the embodiment are denoted by the same reference symbols, and the description thereof will arbitrarily be omitted.

Modified Example 1

(Configuration)

Figure 10:
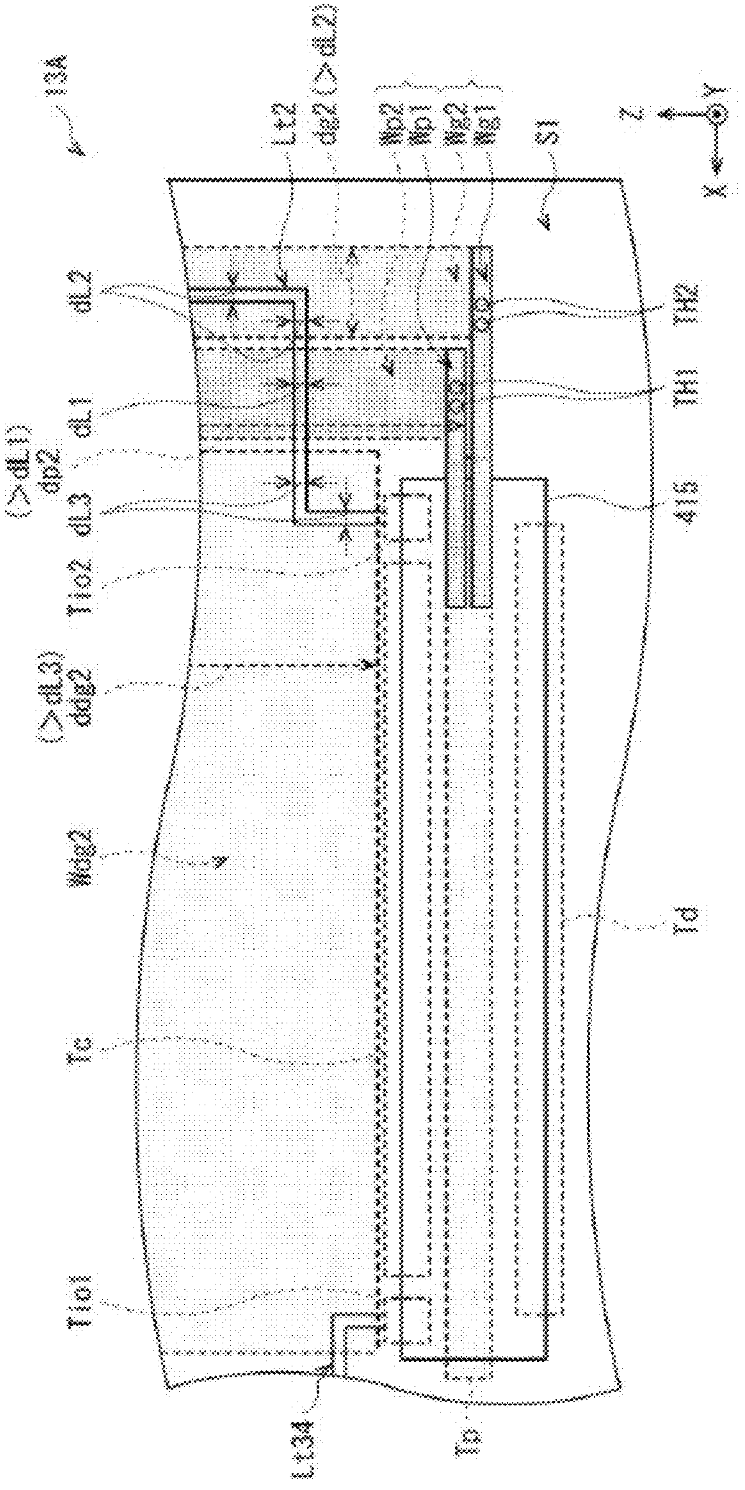
FIG. 10 is a plan view schematically showing an arrangement configuration example of wiring lines, and so on, in a flexible board related to Modified Example 1.
Figure 11:
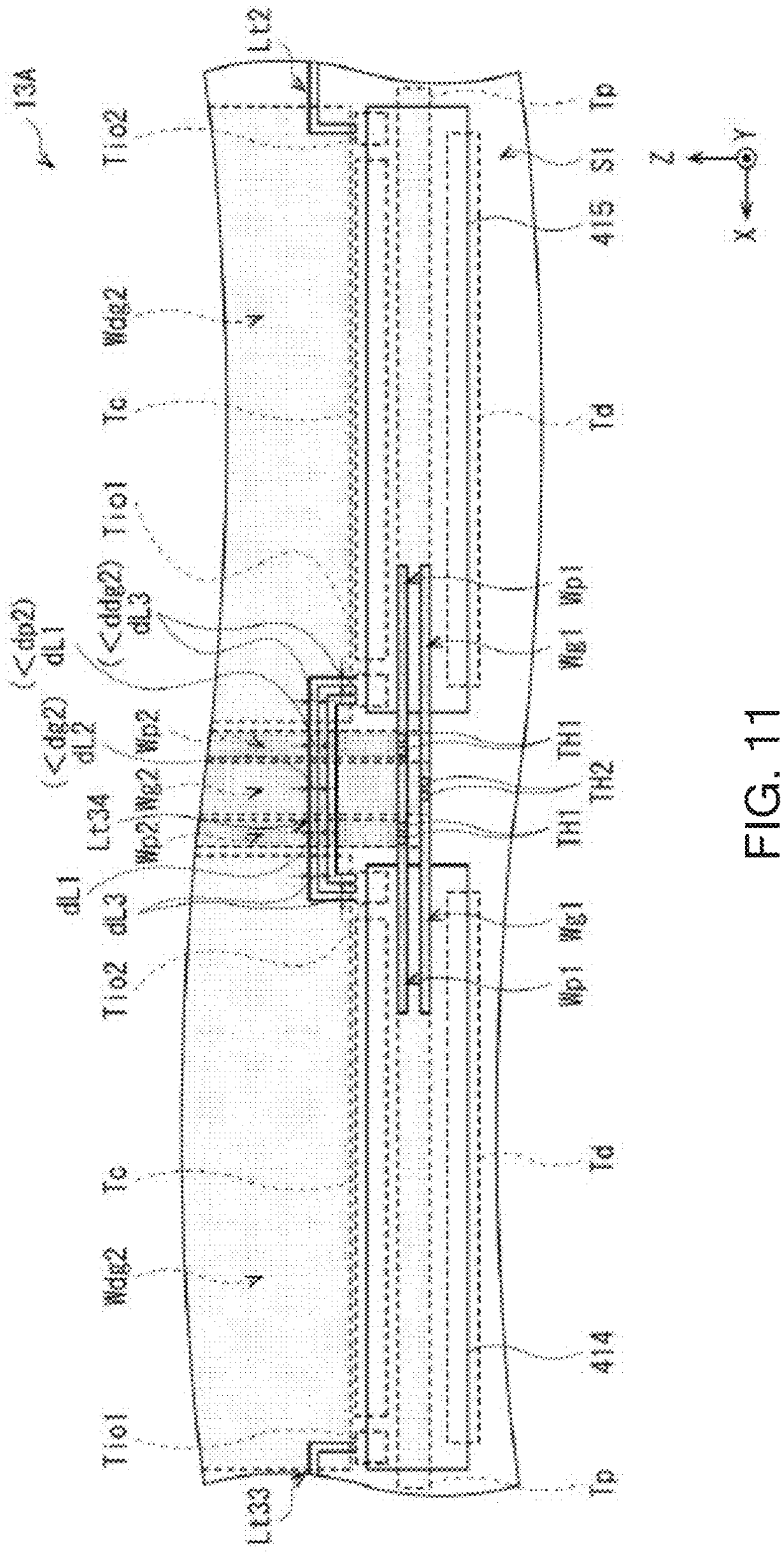
FIG. 11 is a plan view schematically showing an arrangement configuration example of the wiring lines, and so on, in the flexible board related to Modified Example 1.

FIG. 10 and FIG. 11 are each a plan view (a Z-X plan view) schematically showing an arrangement configuration example (the configuration example when viewed from the obverse surface S1 side, described above) of wiring lines, and so on, in a flexible board 13A in a liquid jet head (an inkjet head) according to Modified Example 1. It should be noted that similarly to FIG. 6 and FIG. 7 described in the description of the embodiment, FIG. 10 shows an arrangement configuration example of the wiring lines in the vicinity of the second drive device 415, and FIG. 11 shows an arrangement configuration example of the wiring lines in the vicinity of the second drive device 415 and the third drive device 414.

Here, a printer equipped with the inkjet head according to such Modified Example 1 corresponds to a specific example of the "liquid jet recording device" in the present disclosure. Further, the flexible board 13A, described above, corresponds to a specific example of the "drive board" in the present disclosure.

As shown in FIG. 10 and FIG. 11, the flexible board 13A in Modified Example 1 corresponds to what is obtained by further providing a first ground wiring line Wg1 and a second ground wiring line Wg2 to the flexible boards 13 (see FIG. 6 and FIG. 7) in the embodiment, and is made basically the same in the rest of the configuration.

As shown in FIG. 10 and FIG. 11, the first ground wiring line Wg1 is arranged in the first wiring layer W1 at the obverse surface S1 side in the flexible board 13A. The first ground wiring line Wg1 is a wiring line for supplying the drive power (the ground potential) toward each of the drive devices 41 via the power supply terminal section Tp, described above.

As represented by dotted lines in FIG. 10 and FIG. 11, the second ground wiring line Wg2 is arranged in the second wiring layer W2 at the reverse surface S2 side in the flexible board 13A. As shown in, for example, FIG. 10 and FIG. 11, the second ground wiring line Wg2 is electrically coupled to the first ground wiring line Wg1, described above, via second through holes TH2. Further, as shown in, for example, FIG. 10 and FIG. 11, the second power supply wiring line Wp2 is located between the second ground wiring line Wg2 and the second digital ground wiring line Wdg2, and the second ground wiring line Wg2 extends along the Z-axis direction in the second wiring layer W2. Further, as shown in, for example, FIG. 10 and FIG. 11, the second ground wiring line Wg2 is arranged so as to be opposed to (overlap) a partial area (a second area A2 described later) in the differential line Lt.

Here, in the flexible board 13A in Modified Example 1, as shown in, for example, FIG. 10 and FIG. 11, a wiring width dg2 in the second ground wiring line Wg2 is made larger than a line width dL2 of the second area A2 (an opposed area to the second ground wiring line Wg2), described above, in the differential line Lt (dg2>dL2). It should be noted that the meaning of the width direction in the wiring width dg2 and the line width dL2 is substantially the same as in the case of the embodiment, described above.

(Functions/Advantages)

In such a manner, in the flexible board 13A in Modified Example 1, the wiring width dg2 in the second ground wiring line Wg2, described above, is made larger than the line width dL2 of the second area A2 in the differential line Lt (dg2>dL2). Thus, in addition to the second power supply wiring line Wp2 described in the description of the embodiment, the second ground wiring line Wg2 also functions as the plane, described above, and the impedance control of the differential line Lt is also performed by the second ground wiring line Wg2 in cooperation with the second power supply wiring line Wp2, as a result.

Therefore, in Modified Example 1, it is also possible to widen the wiring width dg2 of the second ground wiring Wg2, the performance of supplying the drive power to each of the drive devices 41 is further enhanced. Further, also in the case of supplying a plurality of types of drive potentials to each of the drive devices 41, it becomes possible to ensure the degree of freedom of the wiring arrangement in the double-layered structure of the wiring layers of the flexible board 13A, as described above. As a result, compared to the embodiment, in Modified Example 1, it becomes possible to further reduce the manufacturing cost of the flexible board 13A and the inkjet head while further enhancing the performance of ejecting the ink 9.

Modified Example 2

(Configuration)

Figure 12:
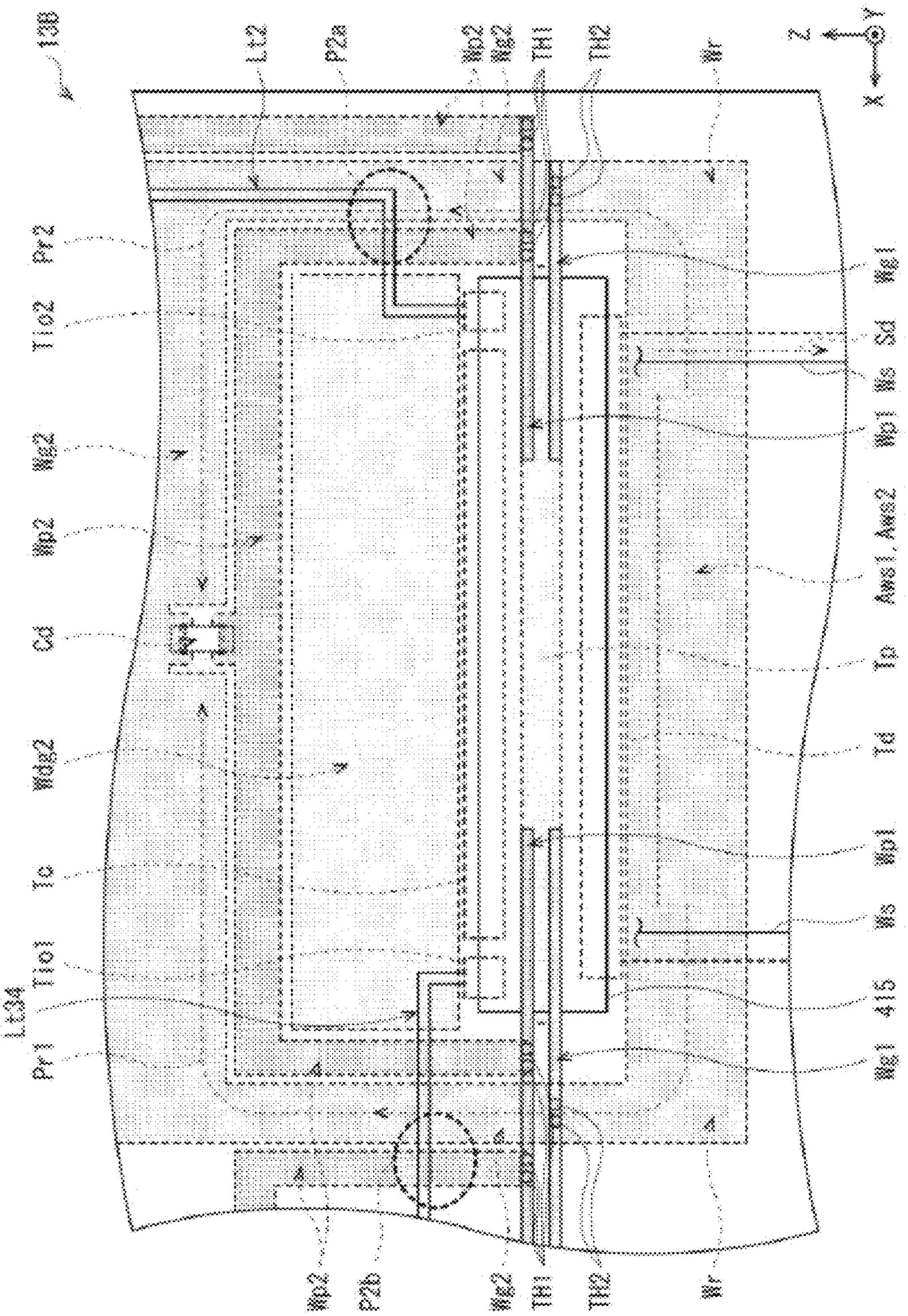
FIG. 12 is a plan view schematically showing an arrangement configuration example of wiring lines, and so on, in a flexible board related to Modified Example 2.
Figure 13:
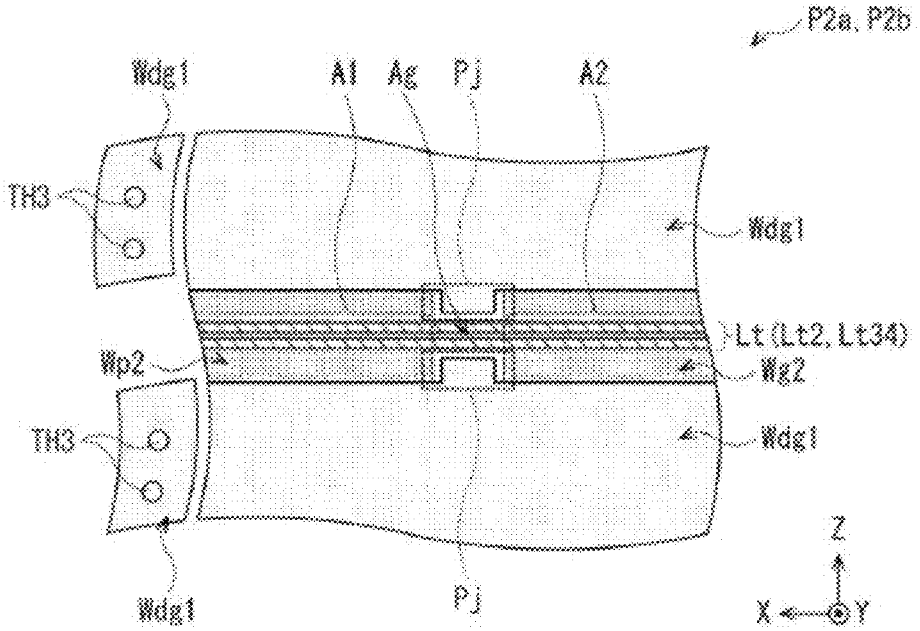
FIG. 13 is a plan view schematically showing a detailed configuration example in a partial area shown in FIG. 12.

FIG. 12 is a plan view (a Z-X plan view) schematically showing an arrangement configuration example (the configuration example when viewed from the obverse surface S1 side, described above) of wiring lines, and so on, in a flexible board 13B in a liquid jet head (an inkjet head) according to Modified Example 2. It should be noted that similarly to FIG. 6 and FIG. 10, described above, FIG. 12 shows the arrangement configuration example of the wiring lines in the vicinity of the second drive device 415. Further, FIG. 13 is a plan view (a Z-X plan view) schematically showing a detailed configuration example (a configuration example when viewed from the obverse surface S1 side) in a partial area (in the vicinity of an area indicated by the reference symbols P2*a*, P2*b*) shown in FIG. 12.

Here, a printer equipped with the inkjet head according to such Modified Example 2 corresponds to a specific example of the "liquid jet recording device" in the present disclosure. Further, the flexible board 13B, described above, corresponds to a specific example of the "drive board" in the present disclosure.

As shown in FIG. 12, the flexible board 13B in Modified Example 2 corresponds to what is obtained by further providing a driving capacitor Cd and a return wiring line Wr including a return path described later to the flexible board 13A (see FIG. 10 and FIG. 11) in Modified Example 1, and is made basically the same in the rest of the configuration.

As represented by, for example, dotted lines in FIG. 12, the driving capacitor Cd is arranged on the second wiring layer W2 (in the component arrangement area 40 shown in FIG. 5) at the reverse surface S2 side in the flexible board 13B. Specifically, as shown in, for example, FIG. 12, the driving capacitor Cd is arranged at the input side (the positive direction side in the Z axis with respect to the second digital ground wiring line Wdg2, described above) of each of the drive devices 41 on the second wiring layer W2. Further, as shown in, for example, FIG. 12, one end of the driving capacitor Cd is electrically coupled to the second power supply wiring line Wp2, and the other end of the driving capacitor Cd is electrically coupled to the second ground wiring line Wg2.

Such a driving capacitor Cd is arranged to be disposed on, for example, the following grounds. That is, in order to perform the ejection drive on a number of nozzle holes Hn at the same time using the drive signals Sd, a capacitance element for bearing the current consumption occurring instantaneously becomes necessary, and therefore, it is arranged to dispose such a driving capacitor Cd in the power supply path. Further, since the current on this occasion occurs as a pulse, it can be said that it is desirable for the driving capacitor Cd for supplementing such pulse currents to be disposed in the vicinity of each of the drive devices 41. Therefore, in Modified Example 2, it is arranged that the driving capacitor Cd is arranged in the vicinity of each of the drive devices 41 in such a manner, as described above.

As represented by dotted lines in, for example, FIG. 12, the return wiring line Wr, described above, is arranged in the second wiring layer W2 at the reverse surface S2 side in the flexible board 13B. Specifically, as shown in, for example, FIG. 12, the return wiring line Wr has a wiring-opposed area Aws2 at an output side of each of the drive devices 41 on the second wiring layer W2. The wiring-opposed area Aws2 is arranged so as to be opposed to a wiring area Aws1 on the first wiring layer W1, including the signal wiring lines Ws, for transmitting the drive signals Sd. Further, as shown in, for example, FIG. 12, the return wiring line Wr is arranged to electrically be coupled to the second ground wiring line Wg2 in the second wiring layer W2.

Such a return wiring line Wr includes a path (the return path) for returning the current to the driving capacitor Cd in the drive signal Sd, as described below. The return path includes such a first return path Pr1 and a second return path Pr2 as shown in, for example, FIG. 12. The first return path Pr1 is a path starting from the wiring-opposed area Aws2, described above, and reaching the driving capacitor Cd via one end side of the drive device 41. The second return path Pr2 is a path starting from the wiring-opposed area Aws2 and reaching the driving capacitor Cd via the other end side of the drive device 41. It should be noted that it is desirable for these two return paths (the first return path Pr1 and the second return path Pr2) to substantially be the same in inductance value L and resistance value R on the path as each other. This is because it is possible to further prevent a noise (a noise caused by the return paths), described later, from occurring.

There, as shown in, for example, FIG. 13, it is preferable to further arrange such a pair of first digital ground wiring lines Wdg1, as described below, in the first wiring layer W1 in the vicinity of the reference symbols P2*a*, P2*b* (see FIG. 12) in the flexible board 13B. The pair of first digital ground wiring lines Wdg1 are arranged at the both sides along the width direction (the Z-axis direction) of the differential line Lt in the first wiring layer W1. Further, the pair of first digital ground wiring lines Wdg1 are each electrically coupled to the second digital ground wiring line Wdg2, described above, via third through holes TH3 shown in, for example, FIG. 13.

Further, as shown in, for example, FIG. 13, it is preferable for such a projecting part Pj, as described below, to be disposed in an area (in the first wiring layer W1) opposed to a gap area Ag in the second wiring layer W2. As shown in, for example, FIG. 13, the gap area Ag, described above, is located between an opposed area to the first area A1 of the differential line Lt in the second power supply wiring line Wp2 and an opposed area to the second area A2 of the differential line Lt in the second ground wiring line Wg2. Further, the projecting part Pj, described, above is a portion projecting toward the differential line Lt from at least one of the pair of first digital ground wiring lines Wdg1, described above. It should be noted that in the example shown in FIG. 13, such projecting parts Pj are respectively provided to both of the pair of first digital ground wiring lines Wdg1, but this example is not a limitation. In other words it is possible to arrange that, for example, such a projecting part Pj is provided only to one of the pair of first digital ground wiring lines Wdg1.

(Functions/Advantages)

In such a manner, in the flexible board 13A in Modified Example 2, there is provided the wiring-opposed area Aws2 opposed to the wiring area Aws1, described above, and at the same time, the return wiring line Wr including the return path, described above, is coupled to the second ground wiring line Wg2 in the second wiring layer W2.

Thus, such a return path is easily coupled to the driving capacitor Cd, and thus, the electrical conduction state between the driving capacitor Cd as the end of the return path and the return wiring line Wr becomes favorable (the electrical coupling with a low impedance is realized). As a result, in Modified Example 2, it is possible to prevent the noise caused by such a return path from being generated, and it becomes possible to further enhance the performance of ejecting the ink 9 compared to the embodiment and Modified Example 1.

Further, in Modified Example 2, since both of the first return path Pr1 and the second return path Pr2, described above, are included in the return wiring line Wr, described above, by the currents respectively flowing via both end sides (one end side and the other end side) of each of the drive devices 41, the following is achieved. That is, since the loop of the return path of the current becomes small, it is possible to prevent the noise from the return path from being generated. As a result, it becomes possible to further more improve the performance of ejecting the ink 9.

Further, in Modified Example 2, since the first digital ground wiring line Wdg1 and the second digital ground wiring line Wdg2 having the arrangement configuration, described above, are respectively disposed, it becomes easy to perform the impedance control of the differential line Lt. Specifically, even when, for example, the capacitance (the electric capacitance) between the second power supply wiring line Wp2 or the second ground wiring line Wg2 and the differential line Lt is lacking, the capacitance is added by the pair of first digital ground wiring lines Wdg1, and therefore, it is possible to easily perform the impedance control of the differential line Lt. As a result, it is possible to improve the transmission quality of the differential signal (the transmission data Dt) to be transmitted on the differential line Lt, and a further fast transmission of the differential signal becomes possible, and therefore, it becomes possible to realize the high-speed printing by the inkjet head.

In addition, in Modified Example 2, since the projecting part Pj is provided to at least one of the pair of first digital ground wiring lines Wdg1 described above, in the first wiring layer W1, the following is achieved. That is, the shortage in the capacitance (the electric capacitance) with the differential line Lt due to the gap area Ag (a plane non-arrangement area located between the second power supply wiring line Wp2 and the second ground wiring line Wg2) in the second wiring layer W2 is avoided as a result. As a result, it is possible to further improve the transmission quality of the differential signal (the transmission data Dt), and a further fast transmission of the differential signal becomes possible, and therefore, it becomes possible to realize the further high-speed printing by the inkjet head.

3. Other Modified Examples

The present disclosure is described hereinabove citing the embodiment and some modified examples, but the present disclosure is not limited to the embodiment, and so on, and a variety of modifications can be adopted.

For example, in the embodiment, and so on, described above, the description is presented specifically citing the configuration examples (the shapes, the arrangements, the number, and so on) of each of the members in the printer 5 and the inkjet head 1, but what is described in the above embodiment, and so on, is not a limitation, and it is possible to adopt other shapes, arrangements, numbers, and so on.

Specifically, for example, in the embodiment, and so on, described above, the description is presented specifically citing the configuration examples of the flexible board (the drive board), the drive device, the differential line, and a variety of wiring lines, and so on, but these configuration examples are not limited to those described in the above embodiment, and so on. For example, in the embodiment, and so on, described above, the description is presented citing when the “drive board” in the present disclosure is the flexible board as an example, but the “drive board” in the present disclosure can also be, for example, an inflexible board. Further, in the embodiment, and so on, described above, there is described the example when the plurality of drive boards are disposed inside the inkjet head, but this example is not a limitation, and it is possible to arrange that, for example, just one drive board is disposed alone inside the inkjet head. Further, in the embodiment, and so on, described above, there is described the example when the plurality of drive devices are disposed in each of the drive boards (so as to be arranged in series to each other), but this example is not a limitation, and it is possible to arrange that, for example, just one drive device is disposed alone in each of the drive boards.

Further, the numerical examples of the variety of parameters described in the embodiment, and so on, described above, are not limited to the numerical examples described in the embodiment, and so on, and can also be other numerical values.

Further, as the structure of the inkjet head, it is possible to apply those of a variety of types. Specifically, for example, it is possible to adopt a so-called side-shoot type inkjet head which emits the ink 9 from a central portion in the extending direction of each of the ejection channels in the actuator plate 111. Alternatively, it is possible to adopt, for example, a so-called edge-shoot type inkjet head for ejecting the ink 9 along the extending direction of each of the ejection channels. Further, the type of the printer is not limited to the type described in the embodiment, and so on, described above, and it is possible to apply a variety of types such as an MEMS (Micro Electro-Mechanical Systems) type.

Further, for example, it is possible to apply the present disclosure to either of an inkjet head of a circulation type which uses the ink 9 while circulating the ink 9 between the ink tank and the inkjet head, and an inkjet head of a non-circulation type which uses the ink 9 without circulating the ink 9.

Further, the series of processes described in the embodiment, and so on, described above, can be arranged to be performed by hardware (a circuit), or can also be arranged to be performed by software (a program). When arranging that the series of processes are performed by the software, the software is constituted by a program group for making the computer perform the functions. The programs can be incorporated in advance in the computer, described above, and are then used, for example, or can also be installed in the computer, described above, from a network or a recording medium and are then used.

Further, in the embodiment, and so on, described above, the description is presented citing the printer 5 (the inkjet printer) as a specific example of the “liquid jet recording device” in the present disclosure, but this example is not a limitation, and it is also possible to apply the present disclosure to other devices than the inkjet printer. In other words, it is also possible to arrange that the “liquid jet head” (the inkjet head) of the present disclosure is applied to other devices than the inkjet printer. Specifically, it is also possible to arrange that the “liquid jet head” of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A drive board which is applied to a liquid jet head having a jet section configured to jet liquid, and which is configured to output a drive signal for jetting the liquid to the jet section, the drive board comprising a first wiring layer and a second wiring layer opposed to each other along a direction perpendicular to a board surface; at least one drive device which is mounted on the first wiring layer, and which is configured to generate the drive signal; a first power supply wiring line which is arranged in the first wiring layer, and which is a wiring line configured to supply drive power toward the drive device; a differential line which is arranged in the first wiring layer, and which is a line configured to transmit a differential signal toward the drive device; and a second power supply wiring line which is arranged in the second wiring layer, which is electrically coupled to the first power supply wiring line via a first through hole, and which is opposed to a first area in the differential line, wherein a wiring width in the second power supply wiring line is larger than a line width of the first area in the differential line.

<2> The drive board according to <1>, further comprising a first ground wiring line which is arranged in the first wiring layer, and which is a wiring line configured to supply ground with respect to the drive power toward the drive device; and a second ground wiring line which is arranged in the second wiring layer, which is electrically coupled to the first ground wiring line via a second through hole, and which is opposed to a second area in the differential line, wherein a wiring width in the second ground wiring line is larger than a line width of the second area in the differential line.

<3> The drive board according to <2>, further comprising a driving capacitor which is arranged in the second wiring layer, one end of which is coupled to the second power supply wiring line, and another end of which is coupled to the second ground wiring line; a wiring area which is arranged in the first wiring layer, and which includes a signal wiring line configured to transmit the drive signal output from the drive device; and a return wiring line which has a wiring-opposed area opposed to the wiring area, and which is arranged to be coupled to the second ground wiring line in the second wiring layer.

<4> The drive board according to <3>, wherein the return wiring line includes a first return path which reaches the driving capacitor from the wiring-opposed area via one end side of the drive device, and a second return path which reaches the driving capacitor from the wiring-opposed area via another end side of the drive device.

<5> The drive board according to any one of <2> to <4>, further comprising a pair of first digital ground wiring lines respectively arranged at both sides along a width direction of the differential line in the first wiring layer; and a second digital ground wiring line which is arranged in the second wiring layer, which is electrically coupled to the pair of first digital ground wiring lines via third through holes, and which is opposed to a third area in the differential line.

<6> The drive board according to <5>, further comprising a gap area disposed in the second wiring layer between an opposed area to the first area of the differential line in the second power supply wiring line and an opposed area to the second area of the differential line in the second ground wiring line; and a projecting part which projects from at least one of the pair of first digital ground wiring lines, and which is disposed in an area opposed to the gap area in the first wiring layer.

<7> The drive board according to any one of <1> to <6>, further comprising a first input terminal and a second input terminal to which the differential signal is input from an outside of the liquid jet head, wherein a plurality of the drive devices is arranged in series to each other in the first wiring layer via a plurality of the differential lines arranged between the first input terminal and the second input terminal.

<8> The drive board according to any one of <1> to <7>, wherein the drive board is formed of a flexible board.

<9> A liquid jet head comprising at least one of the drive board according to any one of <1> to <8>; and the jet section.

<10> A liquid jet recording device comprising the liquid jet head according to <9>.

What is claimed is:

1. A drive board which is applied to a liquid jet head having a jet section configured to jet liquid, and which is configured to output a drive signal for jetting the liquid to the jet section, the drive board comprising:

a first wiring layer and a second wiring layer opposed to each other along a direction perpendicular to a board surface;

at least one drive device which is mounted on the first wiring layer, and which is configured to generate the drive signal;

a first power supply wiring line which is arranged in the first wiring layer, and which is a wiring line configured to supply drive power toward the drive device;

a differential line which is arranged in the first wiring layer, and which is a line configured to transmit a differential signal toward the drive device;

a second power supply wiring line which is arranged in the second wiring layer, which is electrically coupled to the first power supply wiring line via a first through hole, and which is opposed to a first area in the differential line, wherein a wiring width in the second power supply wiring line is larger than a line width of the first area in the differential line;

a driving capacitor which is arranged in the second wiring layer, one end of which is coupled to the second power supply wiring line, and another end of which is coupled to the second ground wiring line;

a wiring area which is arranged in the first wiring layer, and which includes a signal wiring line configured to transmit the drive signal output from the drive device; and a return wiring line which has a wiring-opposed area opposed to the wiring area, and which is arranged to be coupled to the second ground wiring line in the second wiring layer.

2. The drive board according to claim 1, further comprising:

a first ground wiring line which is arranged in the first wiring layer, and which is a wiring line configured to supply ground with respect to the drive power toward the drive device; and a second ground wiring line which is arranged in the second wiring layer, which is electrically coupled to the first ground wiring line via a second through hole, and which is opposed to a second area in the differential line, wherein a wiring width in the second ground wiring line is larger than a line width of the second area in the differential line.

3. The drive board according to claim 1, wherein the return wiring line includes a first return path which reaches the driving capacitor from the wiring-opposed area via one end side of the drive device, and a second return path which reaches the driving capacitor from the wiring-opposed area via another end side of the drive device.

4. The drive board according to claim 1, further comprising:

a pair of first digital ground wiring lines respectively arranged at both sides along a width direction of the differential line in the first wiring layer; and a second digital ground wiring line which is arranged in the second wiring layer, which is electrically coupled to the pair of first digital ground wiring lines via third through holes, and which is opposed to a third area in the differential line.

5. The drive board according to claim 4, further comprising:

a gap area disposed in the second wiring layer between an opposed area to the first area of the differential line in the second power supply wiring line and an opposed area to the second area of the differential line in the second ground wiring line; and a projecting part which projects from at least one of the pair of first digital ground wiring lines, and which is disposed in an area opposed to the gap area in the first wiring layer.

6. The drive board according to claim 1, further comprising a first input terminal and a second input terminal to which the differential signal is input from an outside of the liquid jet head, wherein a plurality of the drive devices is arranged in series to each other in the first wiring layer via a plurality of the differential lines arranged between the first input terminal and the second input terminal.

7. The drive board according to claim 1, wherein the drive board is formed of a flexible board.

8. A liquid jet head comprising:

at one of the drive board according to claim 1; and the jet section.

9. A liquid jet recording device comprising:

the liquid jet head according to claim 8.

* * * * *